US010882058B2

(12) United States Patent
Aagaard et al.

(10) Patent No.: US 10,882,058 B2
(45) Date of Patent: Jan. 5, 2021

(54) SOLID-JACKET SCREW CENTRIFUGE WITH A SOLID DISCHARGE CHAMBER DESIGNED AS A DRYING CHAMBER

(71) Applicant: GEA Mechanical Equipment GmbH, Oelde (DE)

(72) Inventors: Poul-Erik Aagaard, Sporup (DK); Torben Kristensen, Varberg (SE)

(73) Assignee: GEA Mechanical Equipment GmbH, Oelde (DE)

( * ) Notice: Subject to any disclaimer, the term of this patent is extended or adjusted under 35 U.S.C. 154(b) by 1059 days.

(21) Appl. No.: 15/317,880

(22) PCT Filed: Jun. 11, 2015

(86) PCT No.: PCT/EP2015/063097
§ 371 (c)(1),
(2) Date: Dec. 9, 2016

(87) PCT Pub. No.: WO2015/189349
PCT Pub. Date: Dec. 17, 2015

(65) Prior Publication Data
US 2017/0182502 A1    Jun. 29, 2017

(30) Foreign Application Priority Data

Jun. 12, 2014   (DE) .................. 10 2014 108 236

(51) Int. Cl.
*B04B 15/12* (2006.01)
*B04B 1/20* (2006.01)
(Continued)

(52) U.S. Cl.
CPC .............. *B04B 15/12* (2013.01); *B04B 1/20* (2013.01); *C02F 1/52* (2013.01); *C02F 11/127* (2013.01); *B04B 2001/2091* (2013.01)

(58) Field of Classification Search
CPC ... B04B 15/12; B04B 1/20; B04B 2001/2091; C02F 11/127; C02F 1/52
(Continued)

(56) References Cited

U.S. PATENT DOCUMENTS

| 3,245,613 A | 4/1966 | Jonakin |
| 5,321,898 A | 6/1994 | Robinette, Jr. et al. |

(Continued)

FOREIGN PATENT DOCUMENTS

| CN | 1049617 A | 3/1991 |
| CN | 2102802 U | 4/1992 |

(Continued)

OTHER PUBLICATIONS

Japanese Office Action issued in Japanese counterpart application No. 2016-572464 dated Mar. 19, 2019 (Nine (9) pages).

(Continued)

*Primary Examiner* — Walter D. Griffin
*Assistant Examiner* — Shuyi S. Liu
(74) *Attorney, Agent, or Firm* — Crowell & Moring LLP (57) ABSTRACT

A solid-jacket screw centrifuge is disclosed. The centrifuge has a rotatable drum with a horizontal axis of rotation which encloses a bowl with a rotatable screw, an inlet for introducing material to be centrifuged into the bowl, at least one liquid and at least one solid discharge, where at least the solid discharge is assigned a non-rotatable housing surrounding it, at least radially bounding a discharge chamber, where the discharge chamber is designed as a drying chamber for the solid matter and has axial walls and one or more walls in the radial direction. The housing extends axially parallel to the axis of rotation at most into the conical region of the drum or the screw.

16 Claims, 8 Drawing Sheets

(51) Int. Cl.
*C02F 1/52* (2006.01)
*C02F 11/127* (2019.01)

(58) Field of Classification Search
USPC ......... 210/360.1; 494/26, 50, 51, 53, 54, 60, 494/62
See application file for complete search history.

(56) References Cited

U.S. PATENT DOCUMENTS

| | | |
|---|---|---|
| 2013/0168317 A1 | 7/2013 | Vanderbeken |
| 2015/0144573 A1* | 5/2015 | Banerjee .................. C02F 1/56 210/728 |

FOREIGN PATENT DOCUMENTS

| | | |
|---|---|---|
| CN | 102974472 A | 3/2013 |
| CN | 203281423 U | 11/2013 |
| CN | 203281424 U | 11/2013 |
| DE | 1 754 873 U | 10/1957 |
| DE | 43 15 074 A1 | 11/1994 |
| DE | 43 26 410 A1 | 2/1995 |
| DE | 43 32 799 A1 | 3/1995 |
| DE | 101 48 774 A1 | 4/2003 |
| DE | 102 56 674 A1 | 6/2004 |
| EP | 1 318 871 B1 | 6/2003 |
| EP | 2 092 983 B1 | 8/2009 |
| JP | 9-264670 A | 10/1997 |
| JP | 2009-195829 A | 9/2009 |
| WO | WO 93/00562 A1 | 1/1993 |
| WO | WO 2013/101799 A1 | 7/2013 |

OTHER PUBLICATIONS

PCT/EP2016/063097, International Search Report (PCT/ISA/210) dated Sep. 15, 2015, with partial English translation, enclosing Written Opinion of the International Searching Authority (PC7/ISA/237) (Thirteen (13) pages).
German Search Report issued in German counterpart application No. 10 2014 108 236.2 dated Mar. 18, 2015, with Statement of Relevancy (Nine (9) pages).
Chinese Office Action issued in Chinese counterpart application No. 201580030788.3 dated Apr. 2, 2018 (Nine (9) pages).

* cited by examiner

Prior art

SOLID-JACKET SCREW CENTRIFUGE WITH A SOLID DISCHARGE CHAMBER DESIGNED AS A DRYING CHAMBER

This application claims the priority of International Application No. PCT/EP2015/063097, filed Jun. 11, 2015, and German Patent Document No. 10 2014 108 236.2, filed Jun. 12, 2014, the disclosures of which are expressly incorporated by reference herein.

BACKGROUND AND SUMMARY OF THE INVENTION

The invention relates to a solid-jacket screw centrifuge and to a method for operating such a centrifuge.

A centrifuge suspension to be processed can be purified of solids using solid-jacket screw centrifuges. A known solid-jacket screw centrifuge is shown in DE 101 48 774 A. Said document discloses restricting a housing for a solid-jacket screw centrifuge just to the region of the at least one (or several) solid matter discharge and/or liquid discharge. The purpose of this is not to pressurize the entire drum outer chamber but only part of the same during a pressurized operation. DE 43 15 074 A1, DE 102 56 674 A1 and U.S. Pat. No. 5,321,898 are named additionally as the prior art.

In some cases, the solid matter discharged from a solid-jacket screw centrifuge is still moist and has to be dried further after the centrifugal processing if the degree of drying obtained at the solid matter discharge is not yet sufficient in order to process the solids phase—which can consist, for example, of plastics material particles or the like in the disposal region—further in a suitable manner or to dispose/deposit it directly at a disposal site.

Figure 6:
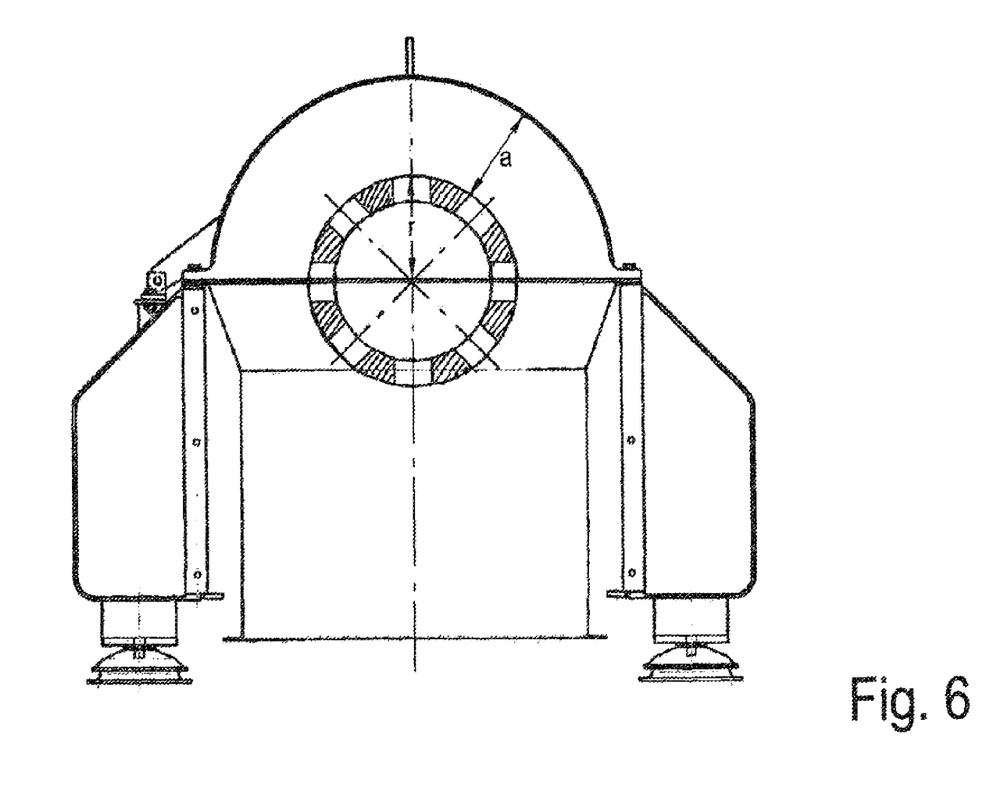
FIG. 6 shows a section through the region of a solid matter discharge of a known solid-jacket screw centrifuge.

In order to dry solids discharged from a solid-jacket screw centrifuge, where applicable, a drying plant is connected downstream of the solid matter discharge chamber of known solid-jacket screw centrifuges and said drying plant serves to dry once or multiple times the solid matter which emerges from the solid matter discharge chamber of the solid-jacket screw centrifuge (see FIG. 6) and which has been diverted out of the same. Thus, it is necessary to influence the solid matter particles to be dried in a time-consuming and costly manner in order, for example after caking, to separate them again, in order to accelerate them by way of a fan or in a hot steam drier, and where applicable to grind, mix, concentrate and dry them. These types of drying plants, which as a rule comprise fans as well as cyclones and other devices, are relatively time-consuming and expensive. In addition, they often require a relatively large amount of energy.

Attempts have also already been made to dry the solids emerging from the drum in a drying chamber which starts at the solid matter discharge and which preferably extends from the solid matter discharge up to the opposite end of the drum, surrounding said drum. These types of structures are disclosed in DE 43 26 410 A1, EP 1 318 871 B1 and WO 93/00562. Common to said structures is that the drying chambers take up a relatively large amount of space and that they comprise a relatively complicated geometry as they extend from the one end of the drum to the other. In addition, it is difficult to direct the solids through the drying chambers, which extend substantially parallel to the drum, by way of a strong air flow. Finally, it is also difficult to clean the chambers formed in a complicated manner.

Against said background, it is the object of the invention to create a centrifuge, in particular a solid-jacket screw centrifuge, by way of which the solids emerging from the drum are dried in a simplified manner. In addition, an advantageous method is to be created by way of which the solids emerging from the drum can be dried in a simple way.

The housing extends axially parallel to the rotational axis no further than into the conical region of the drum or of the screw.

In a particularly advantageous manner, the invention takes advantage of the fact that the solid matter particles, which are centrifuged from the drum, are often still at a relatively high speed so that, as a result of a relatively long flight path, it is possible to obtain a higher degree of drying than when the solid matter particles, centrifuged from the drum, contact a wall directly after exiting the drum where they lose kinetic energy before they slide into a solids collecting chamber and then are supplied to a special ventilation system and are dried. In this connection, it is particularly advantageous that, as a result of the chosen geometry of the housing, said housing can comprise a relatively simple design such that it can be easily cleaned and that in a particularly advantageous manner during the drying process, the effect of the solid matter particles being ejected radially from the drum at high speed is utilized. To this end, it is additionally advantageous when the housing comprises a substantially disk-shaped geometry, the axial extension of which is shorter than the maximum radial extension thereof in the region above the rotational axis D and when the housing preferably extends axially parallel to the rotational axis—proceeding from the solid matter discharge—over no more than half, preferably over no more than a quarter, particularly preferably over no more than 10%, of the axial length of the conical region of the drum. The cone refers to the inside surface or inside contour of the drum. Toward the other side, the drying chamber or the housing ends in front of or in the region of the gearing unit. According to said variant, the design of the housing is simpler and the drum remains largely contaminant-free in the remaining region.

In an advantageous manner, there is no deflection ring surrounding the drum realized between the solid matter discharge openings and the radial walls of the discharge chamber, as is the case in WO093/00562A1.

If the drying is started immediately with a long drying flight phase after emerging from the drum, the solids also do not bake so fixedly to one another in the first place as they are drier than according to the prior art when they impact against the radial walls of the discharge chamber. The drying of the solid matter in this manner is significantly simplified overall.

The drying effect is optimized by using a gas flow, in particular an air flow. As a result, a further drying process can be dispensed with completely or the expenditure on a connecting drying process is reduced. Thus, a supplementary drying plant can certainly still be necessary, but it can be dimensioned to be smaller or can be operated in a more energy-saving manner, for example, at lower temperatures or it does not have to be run through multiple times, as can be the case according to the prior art.

Expenditure on construction and equipment to implement the invention is relatively low. In addition, the energy requirement for the drying can be reduced overall by the kinetic energy of the solids being utilized immediately after being centrifuged in a particularly good manner for improved drying. The flushing of gas or air can be effected by the rotating drum, utilizing the ventilation action thereof. Where applicable, the drum can be provided with one or several fan blades and/or gas or air is supplied by way of a gas flow generator, in particular an air flow generator, which is separate to the drum. The supplied gas (e.g. nitrogen) or the air should be dry, but can be cold or cooled and/or additionally heated, which involves further optimized results depending on the application. The user determines the optimum type of the gas or air flow (temperature, dryness or relative humidity content of the supplied air) simply by testing or, where applicable, by computer.

This may be discussed by way of an example. At an air temperature of 20° C. and relative air humidity of 40%, the absolute humidity is 6.9 g/m³ and the dew point is +5° C. If the temperature is raised to 35° C., the absolute humidity (at 40%) is 15.8 g/m³. The absolute volume of water absorbable and consequently transportable during the drying operation is, in this case, 8.9 g/m³ air. In practice, however, the relative air humidity of a dry air output can be raised, for example, to 70% relative air humidity such that the absolute humidity is 27.7 g/m³. The absolute volume of water absorbable during the drying operation is then 17.8 g/m³ air (with reference to 20° C./40% relative air humidity to 35° C./70% relative air humidity).

The speed of the solid matter emerging from the drum is expediently greater than 50 m/sec, in particular greater than 80 m/sec and particularly preferably greater than 95 m/sec.

Unlike as proposed in the prior art named in the introduction, the axial extension of the drying chamber is preferably relatively small. This means that the drying chamber is essentially limited to the region which is parallel to the rotational axis and connects directly axially to the solid matter discharge openings. The drying chamber is preferably no longer than 1 m, preferably no longer than 0.7 m, in the axial direction thereto. It additionally preferably extends axially only up to the start or beginning of the conical region of the drum (when viewed from the solid matter discharge) or no further than into said region.

The discharge chamber is additionally preferably dimensioned in such a manner that the solids to be discharged are dried therein in such a manner that the dry substance content of the solids emerging from the discharge chamber is at least 5%, preferably at least 7% higher than that of the solids S which enter into the discharge chamber from the solid matter discharge of the drum. In this manner it is possible in many cases, in particular when processing sludge, to move the solids to be dried into a drying state in which they are disposable. For example, the degree of dryness can be increased from 20% by at least 5%, that is to say to more than 25%. This also corresponds to the improvement in relation to conventional discharge chambers in which virtually no or a negligible amount of drying was effected.

The average flight time of the particles prior to impacting against one of the walls of the discharge chamber is preferably more than 0.005 sec, preferably more than 0.03 sec, in particular more than 0.05 sec, in order to achieve excellent drying.

The device and the method are suitable in particular for relatively light solids of low density, in particular for drying solids which, for the predominant part, consist of polymers or are realized as such. The density of such types of solids is preferably less than 1.60 kg/dm³, in particular less than 1.5 kg/dm³. The bottom limit is preferably greater than 1.00 kg/dm³. They are added, for example during wastewater treatment, to the wastewater to be cleaned in particular as a flocculant and are to be removed again by way of the centrifuge.

The invention is also suitable, however, for other purification treatments or concentration treatments. Preferred application examples (suspensions with associated solid matter densities) are:

- extraction of lactose (crystalline) in concentration treatment in a decanter, with the density of 1.52 kg/dm³ of the lactose as solid matter from the initial product milk, in particular cream;
- extraction of casein in the decanter, with the density of 1.25 kg/dm³ as solid matter, in particular from the initial product milk, preferably skimmed milk;
- extraction of protein in the decanter, with a density of 1.1 kg/dm³ from a pea or potato mash as the initial product; or
- extraction of juice and fruit pulp (density: 1.1-1.2 kg/dm³) from carrot mash as the initial product in the decanter;
- extraction of thin stillage and wet grains as solid matter from corn mash in the decanter, the specific weight of the wet grains being 1.03 kg/dm³.

Here too, the (where applicable at least additional) drying of the solids according to the invention is particularly advantageous and simple in each case.

The temperature in the drying region or in the discharge chamber is preferably in excess of 40, preferably in excess of 60° C., during processing of the centrifuge suspension.

In a particularly advantageous manner, the air flow is generated by way of fan blades close to the solid matter discharge openings on a part of the centrifuge which rotates in operation. The fan blades are arranged in a particularly preferred manner radially on the outside of a rotating part of the gearing unit on the side of the solid matter discharge openings that is axially remote from the drum. Contamination of the drum is avoided in this way. The structural expenditure for generating the air flow is additionally particularly low.

Obviously, the proposed type of drying can also be combined with a further additional drying process connected downstream in order to increase the degree of dryness, if this is desired. However, the drying process in the solid matter discharge chamber connected upstream acts in an advantageously energy-saving and time-saving manner according to said variant and simplifies the entire drying process. Thus, the drying equipment connected downstream can be dimensioned in a smaller and more energy-saving manner than according to the prior art.

Exemplary embodiments are described in more detail below by way of the drawings.

BRIEF DESCRIPTION OF THE DRAWINGS

FIG. 2 shows a section through the region of a solid matter discharge of a solid-jacket screw centrifuge in the manner of FIG. 1a;

DETAILED DESCRIPTION OF THE DRAWINGS

Figure 1A:
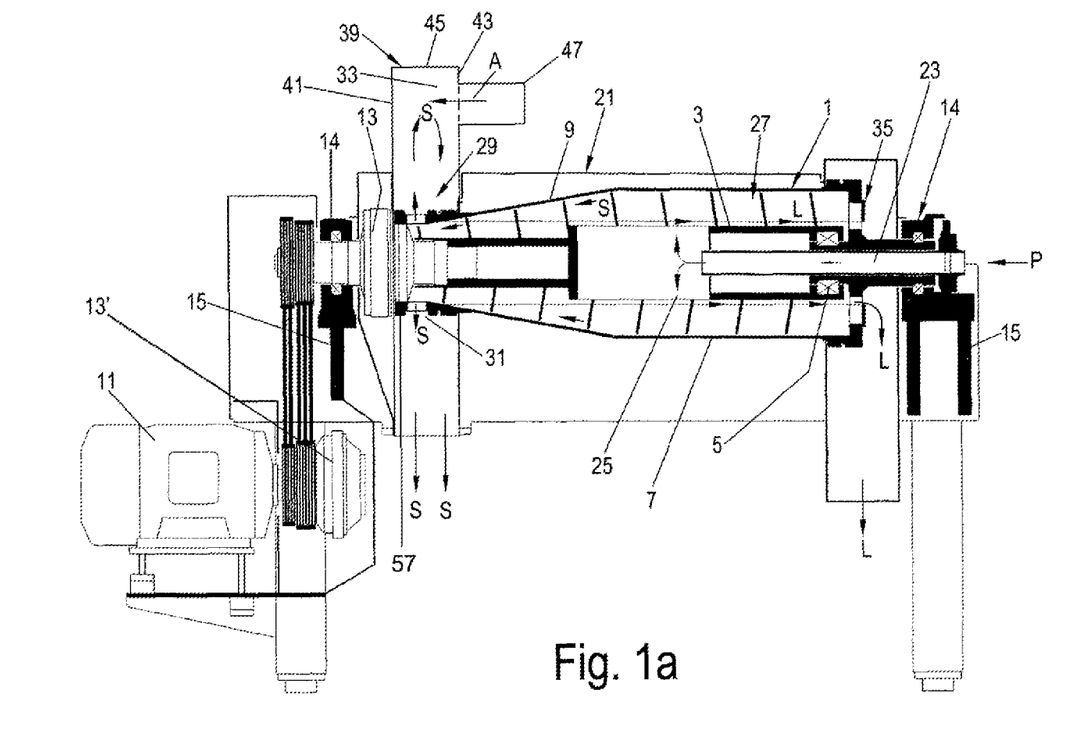
FIG. 1a shows a schematic representation of a first variant of a solid-jacket screw centrifuge.
Figure 1B:
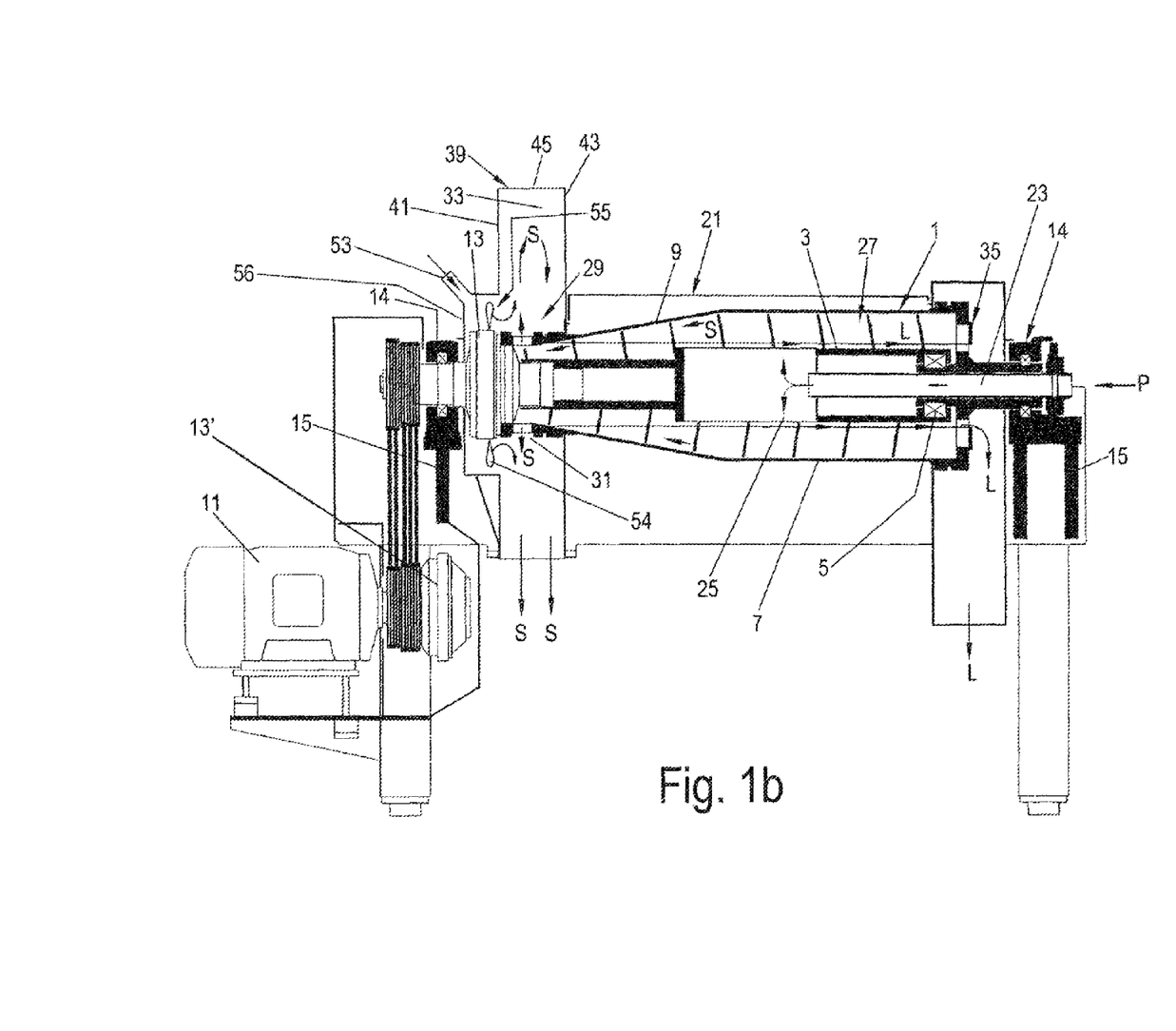
FIG. 1b shows a schematic representation of a second variant of a solid-jacket screw centrifuge.

FIGS. 1a and b each show a solid-jacket screw centrifuge with a drum 1 and a screw 3 arranged in the drum for conveying/transporting a centrifuge suspension to be processed. Bearings 5 and seals are arranged in each case at both ends of the solid-jacket screw centrifuge between the drum 1 and the screw 3 (only shown/recognizable here in part). In its rear region in FIG. 1, the drum 1 comprises a cylindrical portion 7 and in its front region connecting thereto in FIG. 1, preferably a conically (or however gradually) tapering portion 9. A cylindrical portion (inner contour of the drum), which has a smaller diameter than the other cylindrical portion 7 (inner contour), then connects in turn to the conical portion 9 (inner contour). The solid matter discharge is realized in said cylindrical portion 57.

At least one drive device 11 and at least one or several gearing units 13, 13' serve for driving the drum 1 and the screw 3. The at least one gearing unit 13 connects to the cylindrical portion 57 on the side axially remote from the conical portion.

Figure 2:
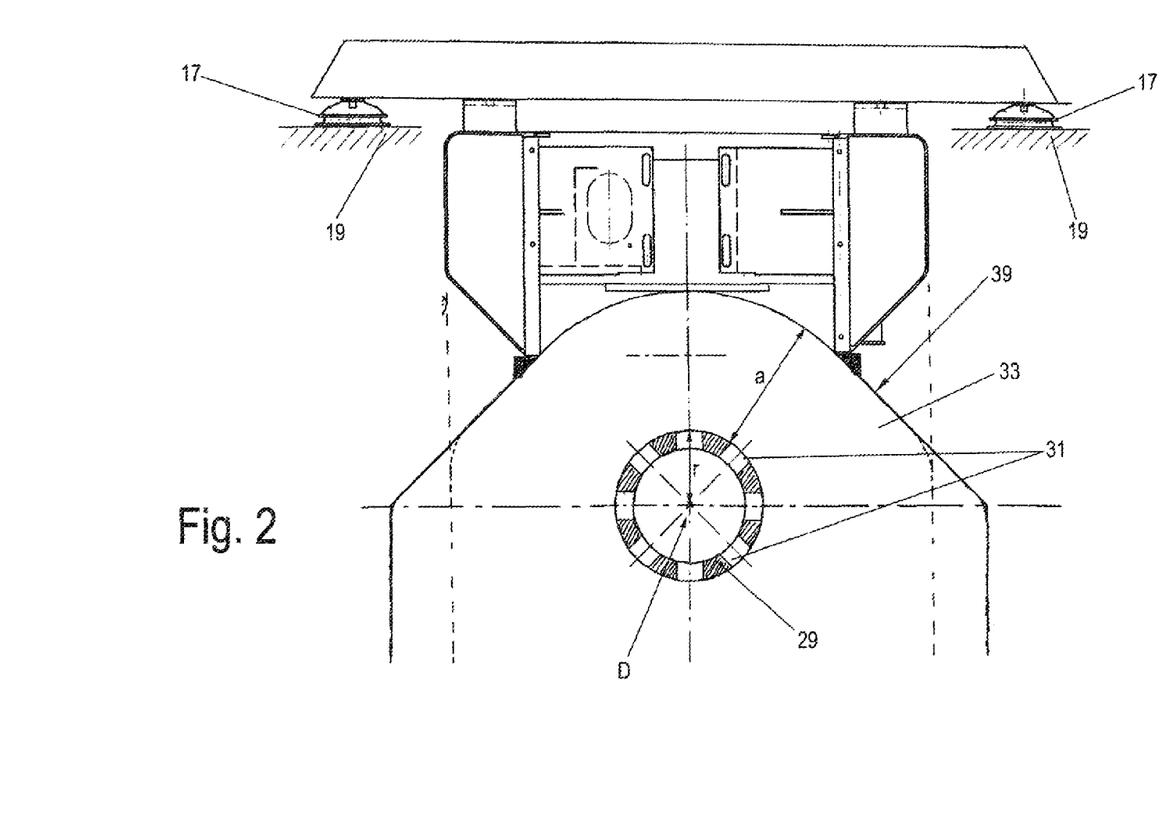

The drum 1 is mounted so as to be rotatable by means of bearings 14 on at least one framework 15 which is supported on a base 19 by means of one or several feet 17 and, where applicable, spring arrangements (see also FIG. 2 which differs, however, from the development of FIG. 1 in a manner yet to be explained). The drum 1 is additionally surrounded by a hood 21.

The drum 1 and the screw 3 of FIG. 1 comprise a horizontal rotational axis D (FIG. 2). However, also conceivable is an alignment of the rotational axis in particular in the vertical direction (see FIG. 4).

A centric feed pipe 23 and a distributer 25 connecting thereto serve for feeding a centrifuge suspension P (or a suspension P to be processed) into the drum 1.

The centrifuge suspension is purified of solids S in the drum 1. A solids phase produced from solids S and a liquid phase L are consequently diverted off (in opposite directions). Where applicable, phase separation into one or several liquid phases L of various densities can also be effected.

The centrifuge suspension P is directed through the centrally arranged feed pipe 23 into the distributor 25 and from there through radial openings in the distributor 25 into the centrifuge chamber 27 with the screw 3 and the drum 1 surrounding the screw 3.

The centrifuge suspension is accelerated when passing through the distributor 25 and when entering into the centrifuge chamber 27. Solid matter particles are deposited on the drum wall as a result of the effect of the centrifugal force.

The screw 3 rotates at a somewhat slower or faster speed than the drum 1 and conveys the centrifuged solid matter S toward the tapering portion out of the drum 1 to a solid matter discharge 29 with one or preferably several solid matter discharge openings 31 which are distributed over the circumference and open out into a collecting chamber 33.

The liquid L, in contrast, flows to the larger drum diameter at the rear end of the drum 1 and there is diverted through a liquid discharge 35 into a drainage chamber 37 and from there into lines and/or containers that are not shown here. The centrifuge suspension to be processed can additionally also be separated into two liquid phases of different densities and then directed out of the drum through two liquid discharges arranged on different radii at the rear end of the drum (the latter is not shown here).

As can easily be seen in FIGS. 1a, 1b and 2, the discharge chamber 33 for the solid matter S is designed in the manner of a housing 39 which comprises axial walls 41, 43, which comprise in the radial direction walls 45 which are relatively far removed from the actual solid matter discharge openings 31, such that the solid matter S to be discharged is initially able to fly relatively far radially from the drum 1, which is rotating at high speed, in a curve outward until it impacts there, where applicable against the inside surface of the walls 45.

By flying for a relatively long period until it comes up against the walls 45 or until it drops down vertically, the solid matter is dried for a relatively long period in the air during its flight. Said effect is advantageously strengthened by a gas flow generator, in particular an air flow generator 47, for example a blower (preferably an air compressor) (see FIG. 1a), being provided, said blower being arranged and designed in such a manner that, for discharging the solid matter S, it generates, inside the discharge chamber 33, a relatively strong gas flow, in particular an air flow A, which supports the drying of the solid matter S ejected from the drum.

It must be mentioned that it is also advantageously conceivable to use an element, which rotates in operation, on the drum 1 or on an element that is connected to the drum, in addition to a separate fan or as the only fan, in particular when it is provided with one or several fan blades on the outside circumference, for example in the interior of the housing, which generate an additional drying gas flow, in particular an air flow, in the housing 39 of the discharge chamber 33.

According to FIG. 1b, this is achieved in the case of a design that otherwise largely concurs with FIG. 1a, by one or several fan blades 54 being realized/arranged on the outside of the drum circumference, on the outside of an element of the gearing unit that rotates in operation, in the axial extension of the drum (or on an end region of the drum, preferably very close axially). The axial distance between the fan blades 54 and the solid matter discharge openings 31 is preferably less than 600 mm. In this way, the necessary drying air flow is immediately generated by way of an element, which rotates in operation, of the rotating system (with which the drum 1 and rotating parts of the gearing unit are associated) at the lowest expenditure.

The housing 39, in this case, extends up to into the region radially outside the gearing unit 13 or in said region it comprises a housing attachment 56 (in a preferred manner with a diameter that is smaller relative to the rest of the housing 39). At least one intake opening 53, through which air from outside can be sucked into the housing attachment 56 and which is blown therefrom into the actual (drying) housing 39, is realized in the region outside the gearing unit 13, in the housing attachment 56. To this end, the housing attachment 56 comprises a passage 55 into the actual drying housing 39, through which the air taken in through the intake openings 53 can be blown by the fan blades out of the housing attachment 56 into the actual housing 39. Another advantage of the centrifuge of FIG. 1b is that the fan blades 54 are located on the side of the solid matter discharge openings 31 remote from the conical region of the drum such that the actual drum 1 is not able to be contaminated by solid matter in operation.

As a result of one or both of the advantageous features "gas flow generator, in particular air flow generator for generating an air flow which supports, where applicable heats, the drying of solids in the discharge chamber 33" and "relatively large inner radius of the discharge chamber", it is already possible to dry the emerging solids S of the solid matter phase in a relatively strong manner immediately after their exit from the drum 1. It is particularly advantageous here for the emerging solids (see FIG. 5, step 100) to still be distributed in a relatively fine manner and still to comprise a relatively fast speed when they emerge from the solid matter discharge openings. Said speed is exploited in an advantageous manner in the drying process as the discharge chamber 33 comprises a large radius. This is amplified when a strong, where applicable hot or, however, cooled air flow A is generated directly in said discharge chamber (step 200) which additionally dries the emerging solid matter particles S immediately after they emerge from the drum 1. As a result, the residual liquid L' is separated from the solids, which are then diverted as further dried solids S*' out of the discharge chamber 33, for example by dropping onto a conveyor belt (which can be heated/ventilated in addition to the residual drying). As a result, it is possible to design additional devices for drying, such as blowers or cyclones etc., which can be connected to the discharge chamber 33 in accordance with the prior art, in a smaller than usual manner or, however, even to dispense with them completely.

Figure 5:
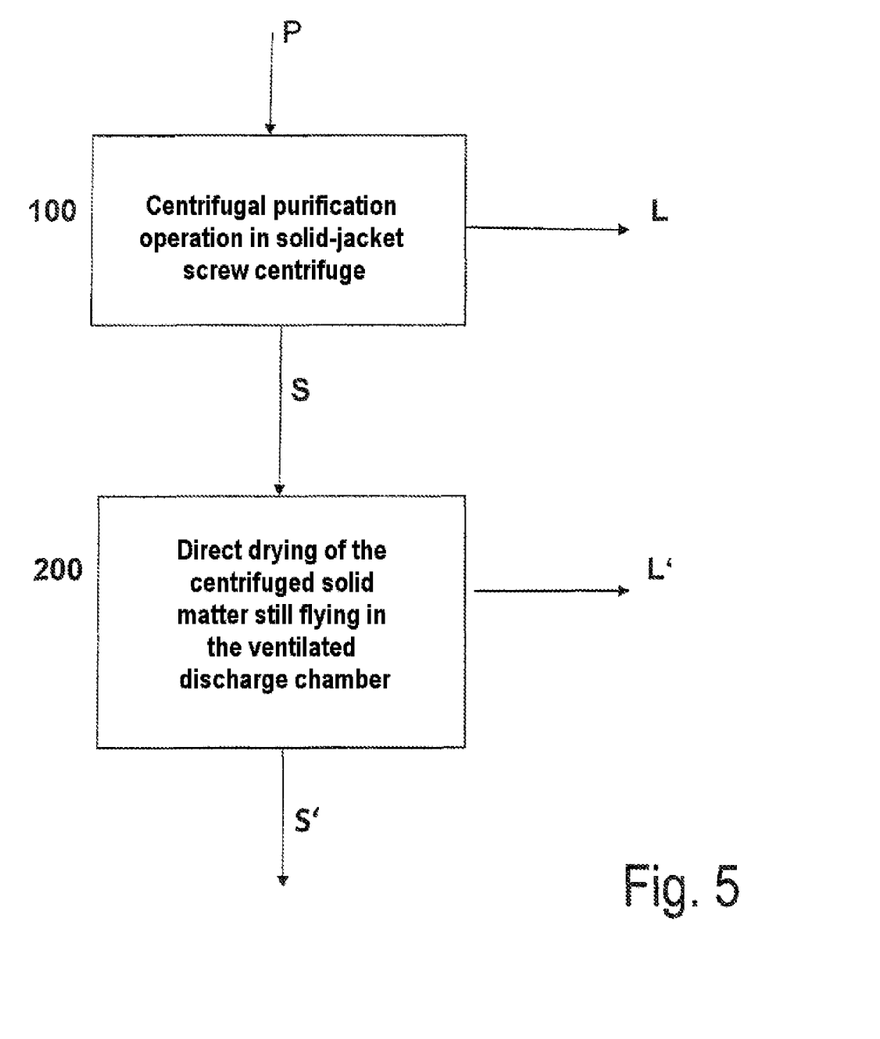
FIG. 5 shows a flow diagram to illustrate a method according to the invention for processing a centrifuge suspension.
Figure 7:
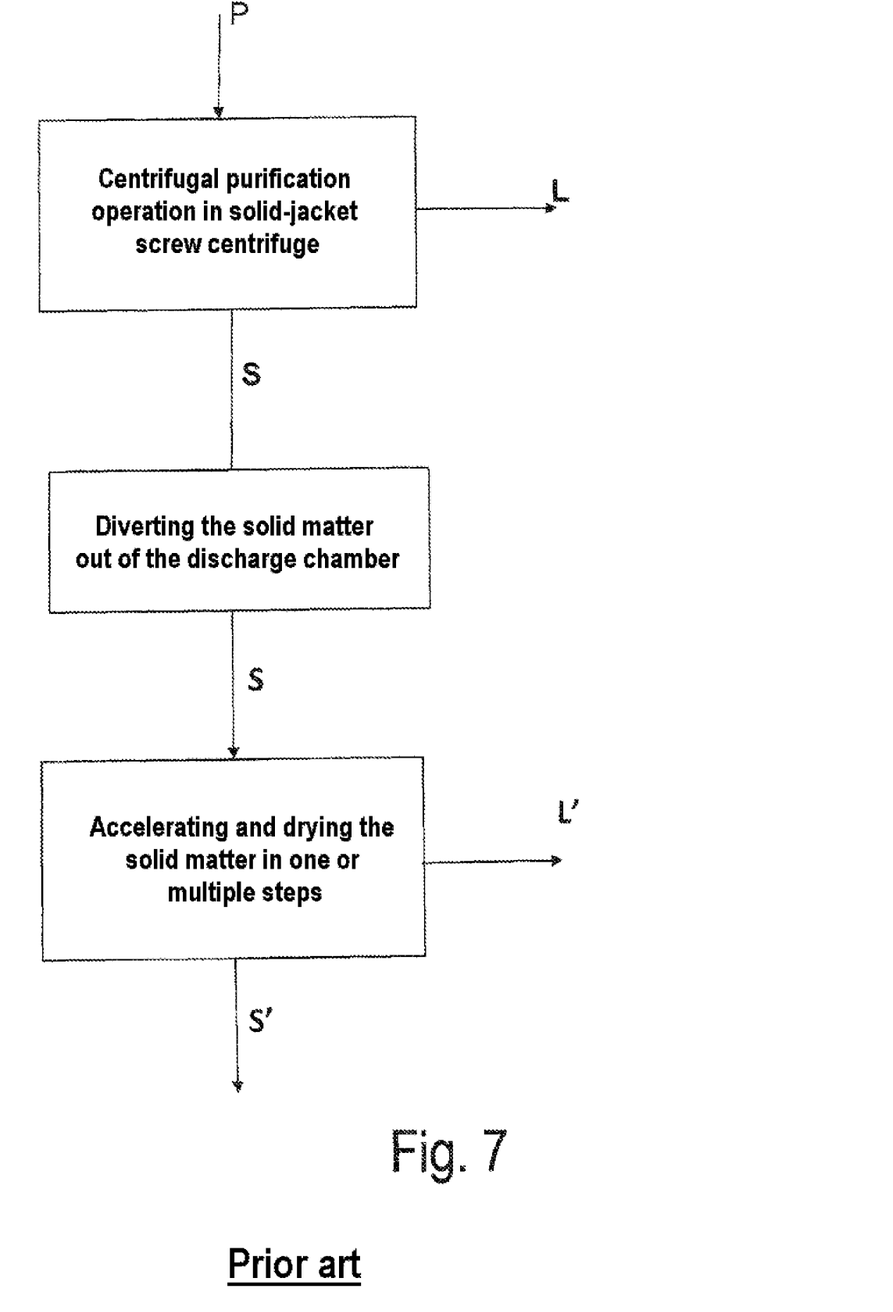
FIG. 7 shows a flow diagram to illustrate a known method for processing a centrifuge suspension.

A comparison between FIGS. 5 and 7 illustrates the invention in a particularly advantageous manner. According to the prior art, which is shown in FIG. 7, the solid matter S, which has emerged from the solid-jacket screw centrifuge, is first of all diverted in its entirety out of the solid matter discharge chamber and is only then dried. As a result, it is necessary first of all to accelerate and separate solid matter centrifuged out of the discharge chamber prior to the diversion again by way of fans or the like in order to obtain fine particles which can be dried, residual liquid L' being separated off and a dried solid matter S' remaining.

The intermediate step of renewed acceleration of the solids can be advantageously dispensed with when the flight phase of the solid matter is lengthened when flying in the discharge chamber 33 and is utilized in such manner immediately for drying in a practically relevant way. An even better drying process is possible when the already mentioned gas flow, in particular air flow A, additionally dries the particles in said flight phase. In this case, it is once again advantageous when the gas flow, in particular air flow, has been tempered.

FIG. 2 illustrates a section perpendicular to the rotational axis D in the region of the solid matter discharge openings 31. As can easily be seen, a plurality of solid material discharge openings 31 is provided in the region of the solid matter discharge 29 of the drum 1, preferably distributed over the circumference at 30° angles.

The radial walls 45 or the next radial wall 45 is/are arranged (here vertically) above the solid matter discharge openings 31 relatively far away from said solid matter discharge openings.

In a particularly preferred manner, the average and/or the smallest/minimum distance a between the wall 45 and the nearest solid matter discharge opening 31 is, at least in the region of the housing 39 which is located above the rotational axis D, greater than twice the distance "2r" between the solid matter discharge openings and the rotational axis D.

The following is preferably true:
a>4r, in particular.
a>6r, particularly preferred a >8r or even a >10r.

In particular, the average radial distance between the walls in the region of the solid matter discharge is vertically above the rotational axis (that is to say in the top half of the chamber above the rotational axis) of the drum 1 in the above-mentioned region.

By means of large radii and further lengthened flight times as a result, the drying of the emerging solids S is supported in an even better manner in each case.

In this case, the housing 39 extends axially parallel to the horizontal rotational axis D only over a relatively short portion of the drum which is limited essentially to a region of the solid matter discharge and to the part thereof of the drum directly adjoining thereto. Toward the drum, the housing 39 preferably ends in front of or no further than the conical region of the drum. Toward the other side, the drying chamber or the housing 39 can certainly be longer. They or the housing 39 preferably end here in front of or in the region of the gearing unit 13. According to FIG. 1*a*, the axial extension of the housing corresponds precisely or approximately to the axial length of the cylindrical region 57 of the drum 1 with the solid matter discharge 29. According to said variants, the design of the housing in each case is simple and the drum is not contaminated by solid matter outside the housing.

Figure 3:
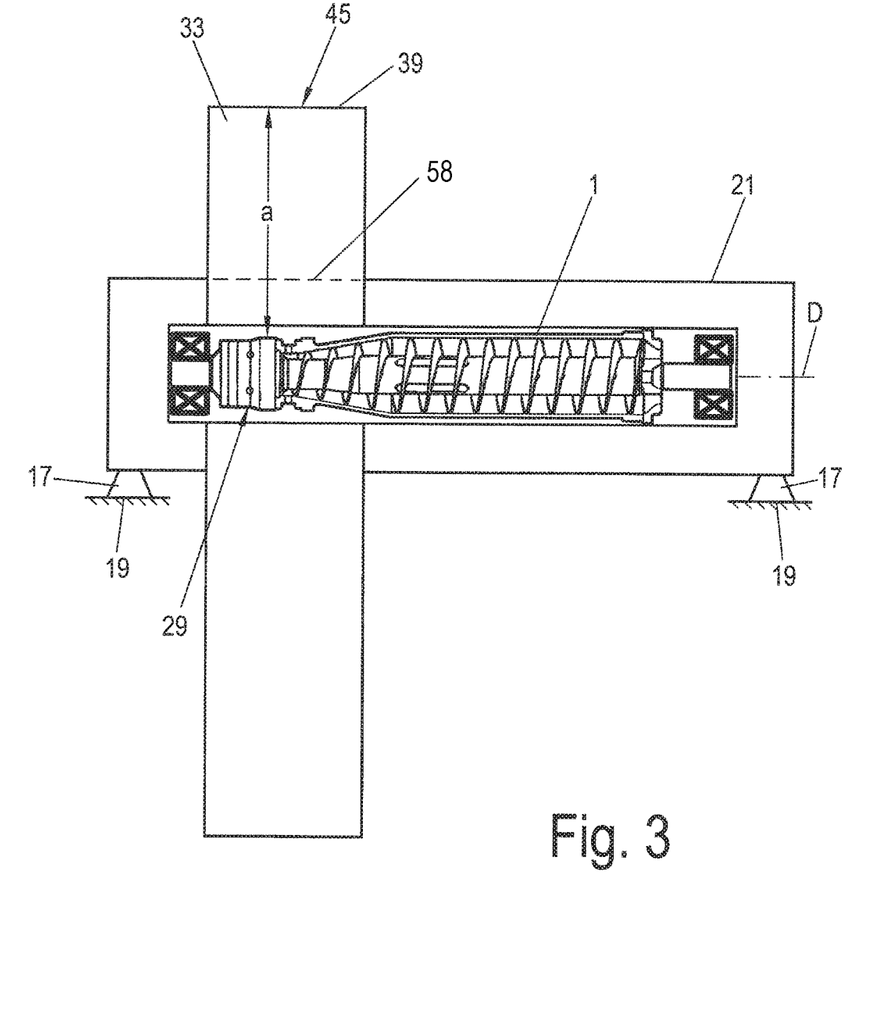
FIG. 3 shows a schematic representation of a third variant of a solid-jacket screw centrifuge.

In particular in the case of large radii a >2r or more, it can be advantageous when load-bearing elements of a machine frame structure, such as axially extending struts 58 or posts, extend through the interior of the housing 39 and consequently the interior of the discharge chamber 33 in particular at a distance from the walls thereof (indicated in FIG. 3 by the broken lines at 58). This is advantageous as in this manner the stability of the "solid-jacket screw centrifuge" system with the machine frame is not impaired by the extraordinarily large discharge chamber. It was precisely the machine frame that was a factor that strongly limited the radius of the discharge chamber in the case of existing structures. Said problem has been overcome in a simple manner by the above-described measure of the struts 58 in the (solid matter) discharge chamber 33.

As an alternative to this, the housing 39 can itself assume a load-bearing, machine-frame-like function or can itself be developed as a load-bearing part. To this end, the housing 39 preferably comprises greater sheet metal wall thicknesses than in the region 21 and/or angled struts in the edge regions (not shown here).

As can be seen further, the housing 39 continues to widen vertically downward before its width remains constant. The housing does not comprise a radially narrowing region vertically downward.

In a preferred manner, the solid matter particles fly freely for a relatively long period in the chamber 33 until they come up against radial walls 45 of the housing 39 of the discharge chamber 33. The speed v of the emerging solid matter particles S of the solid matter phase, the strength of the gas flow, in particular air flow, in the discharge chamber 33 and the radial distance between the wall(s) 45 of the housing 39 and the solid matter discharge openings 31 are preferably matched to one another such that more than 70%, in particular more than 85% of the particles drop vertically downward onto a boundary or a conveyor belt or the like without having touched another lateral wall 45 of the discharge chamber 33 beforehand.

That the gas flow generator, in particular air flow generator, can be attached axially onto the housing 39 cannot be seen in FIG. 2. As explained, it preferably generates a hot or a cooled gas flow, in particular air flow. The temperature of the gas flow, in particular of the air flow, is preferably >40° C.

FIG. 2 illustrates that it can be advantageous when the solid-jacket screw centrifuge is realized as a suspended structure (unlike in the prior art, see FIG. 5). In this case, the drum plus hood and in particular with the housing underneath is suspended on a carrier arrangement 49 which is supported by means of stands 17 and, where applicable, spring elements on the base 19 or the like. The advantage here is that a lot of space is produced as a result which makes it possible to distance the walls 49 relatively far from the solid matter discharge openings 31 in the radial direction.

FIG. 3 once again illustrates the fundamental design of the structure of FIG. 1 with the horizontal rotational axis D, it being recognizable here that the radial distance between the walls 45 of the housing 39 can also be chosen to be very large such that it is true that the minimum distance a from the wall 45 to the nearest solid matter discharge opening 31 is at least greater than a >4r.

Figure 4:
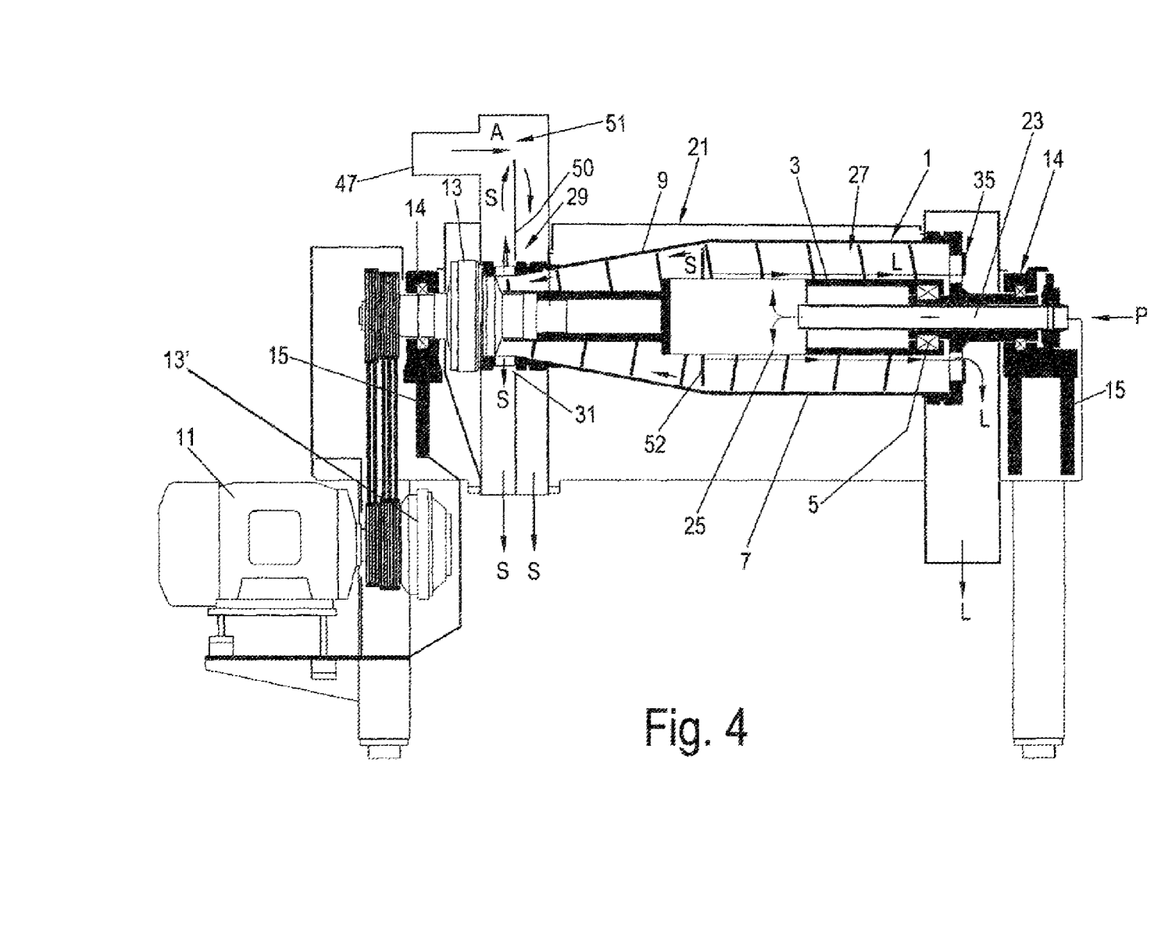
FIG. 4 shows a schematic representation of a fourth variant of a solid-jacket screw centrifuge.

FIG. 4 shows a solid-jacket screw centrifuge with a vertical rotational axis D', the design of which largely corresponds to that of FIG. 1.

In contrast to FIG. 1, however, the discharge chamber 33 of FIG. 1 comprises several, here two, part chambers 33a and 33b. To this end, a wall 50 (here extending vertically), which divides the discharge chamber into the two part chambers 33a, b which are arranged side by side and are interconnected by a passage 51 in the radial outer and top region, is realized/arranged inside the discharge chamber. The gas flow, in particular air flow A, which is generated by the gas flow generator, in particular air flow generator, is essentially directed axially into the passage such that the solids S are blown by it out of the one part chamber 33a into the other part chamber 3b, in which they drop downward. As a result of a labyrinth-like division of the discharge chamber 33a, b into two or more interconnected part chambers 33a, b, the drying effect is improved further as the solid matter flies for a particularly long period until it comes up against the walls of the discharge chamber 33 or against the bottom of the discharge chamber 33.

FIG. 1 also shows a baffle plate 52 on the outside circumference of the screw body. The baffle plate 52 is preferably arranged in the transition region between a conical and a cylindrical portion. Solids build up on it which, however, are nevertheless conveyed by way of the screw in the direction of the solid matter discharge through a gap between the outside radius of the baffle plate 52 and the inside wall of the drum 1. This is of particular interest in order to increase the liquid level in the cylindrical portion. This is important in the case of certain structures in order to prevent liquid, where applicable, from flowing out through the solid matter discharge if the design of the drum and the screw were to permit this, for example when the solid matter discharge is located on a relatively large outside diameter and the conicity angle is relatively small.

A solid-jacket screw centrifuge (not shown here) with a vertical rotational axis D' is also conceivable, here too the radial (and in this case horizontal) distance between the walls 45 of the housing 39 being able to be chosen to be very large such that it is true that the minimum distance a between the wall 45 and the nearest solid matter discharge opening 31 is at least greater than a>r, in particular a >2r, preferably a>8r. Said variant, however, is less preferred than the one with a solid-jacket screw centrifuge with a horizontal rotational axis as in the case of said latter; the drying chamber can be developed for this purpose in a particularly advantageous manner in the vertical direction such that the solids S to be dried describe a particularly long lasting, drying flight path therein on account of the force of gravity.

The method according to the invention was tested in a trial with sludge from a public sewage plant. In this connection, a cover of a discharge chamber 33 of a type UCD 305 decanter of the Applicant was modified such that the particles (i.e. the solid matter S), in particular polymer particles which emerged from the solid matter discharge openings during wastewater treatment, could fly for longer. This was compared to an operation where the cover was not removed. In relation to said conventional decanter, the dry matter content in the solid matter was increased by the drying by approximately 5% or even 7% or more, which is very advantageous as this can be sufficient to be able to process the solid matter directly or to store it ready for disposal. As the solid matter consists essentially of polymer particles which comprise a relatively low density, they fly for a relatively long time and relatively slowly in the discharge chamber 33 and, as a result, are correspondingly well-dried.

LIST OF CHARACTERS

Drum 1
Screw 3
Bearing 5
Cylindrical portion 7
Conical portion 9
Drive device 11
Gearing unit 13
Bearing 14
Machine frame 15
Stands 17
Base 19
Hood 21
Inlet pipe 23
Distributor 25
Centrifuge chamber 27
Solid matter discharge 29
Solid matter discharge openings 31
Discharge chamber 33
Liquid discharge 35
Drainage chamber 37
Housing 39
Walls 41, 43
Wall 45
Gas flow generator 47
Carrier arrangement 49
Wall 50
Passage 51
Baffle plate 52
Intake opening 53
Fan blades 54
Passage 55
Housing attachment 56
Cylindrical region 57
Strut 58
Centrifugal suspension (inlet) P
Liquid L
Solid matter S
Air A
Dimensions a, r

The invention claimed is:
1. A solid-jacket screw centrifuge, comprising:
a rotatable drum with a horizontal rotational axis, wherein the rotatable drum surrounds a centrifuge chamber with a rotatable screw;
an inlet for introducing a suspension to be centrifuged into the centrifuge chamber; and
a liquid discharge and a solid matter discharge;
wherein at least the solid matter discharge has assigned thereto a non-rotatable housing which surrounds the solid matter discharge and delimits a discharge chamber at least radially;
wherein the discharge chamber is a drying chamber for solid matter, wherein the drying chamber has axial walls and a radial wall;
wherein the housing extends axially parallel to the rotational axis no further than into a conical region of the drum or of the screw;

wherein load-bearing elements of a machine frame structure extend through an interior of the housing.

2. The solid-jacket screw centrifuge as claimed in claim 1, wherein the housing has a substantially disk-like geometry with an axial extension that is shorter than a maximum radial extension thereof in a region above the rotational axis.

3. The solid-jacket screw centrifuge as claimed in claim 1, wherein an average and/or a smallest radial distance "a" between the radial wall, at least in a region above the rotational axis, and the solid matter discharge is at least greater than twice a distance "r" between the solid matter discharge and the rotational axis.

4. The solid-jacket screw centrifuge as claimed in claim 3, wherein a >8r.

5. The solid-jacket screw centrifuge as claimed in claim 1, wherein disposed inside the discharge chamber is a wall which divides the discharge chamber into two part chambers which are disposed side by side and are interconnected by a passage, wherein the wall extends perpendicular to the rotational axis and/or the passage is located above the rotational axis.

6. The solid-jacket screw centrifuge as claimed in claim 1, wherein the housing extends axially up to in front of a gearing unit or up to into a region of the gearing unit on a side remote from the conical region of the drum or of the screw.

7. The solid-jacket screw centrifuge as claimed in claim 1, wherein the housing extends axially parallel to the rotational axis proceeding from the solid matter discharge over no more than half of an axial length of the conical region of the drum or of the screw.

8. The solid-jacket screw centrifuge as claimed in claim 1, further comprising a gas flow generator for generating a gas flow in the discharge chamber.

9. The solid-jacket screw centrifuge as claimed in claim 8, wherein the gas flow generator is a fan.

10. The solid-jacket screw centrifuge as claimed in claim 8, wherein a rotating element of the centrifuge is the gas flow generator.

11. The solid-jacket screw centrifuge as claimed in claim 8, wherein the drum or a gearing unit element is utilized as the gas flow generator.

12. The solid-jacket screw centrifuge as claimed in claim 1, wherein the drum is provided with one or several fan blades.

13. The solid-jacket screw centrifuge as claimed in claim 1, wherein a gearing unit part of a gearing unit, which rotates with the drum in operation, is provided with one or several fan blades on a side of the solid matter discharge.

14. The solid-jacket screw centrifuge as claimed in claim 8, wherein the gas flow generator has assigned thereto at least one tempering device for tempering the gas flow.

15. The solid-jacket screw centrifuge as claimed in claim 1, wherein the housing widens vertically downward proceeding from a smallest distance "a".

16. The solid-jacket screw centrifuge as claimed in claim 1, wherein the solid-jacket screw centrifuge is a suspended structure.

* * * * *